(12) United States Patent
Tang

(10) Patent No.: US 11,246,130 B2
(45) Date of Patent: Feb. 8, 2022

(54) METHOD FOR SIGNAL TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 2 days.

(21) Appl. No.: 16/308,694

(22) PCT Filed: Jul. 21, 2016

(86) PCT No.: PCT/CN2016/090910
§ 371 (c)(1),
(2) Date: Dec. 10, 2018

(87) PCT Pub. No.: WO2018/014306
PCT Pub. Date: Jan. 25, 2018

(65) Prior Publication Data
US 2019/0150149 A1    May 16, 2019

(51) Int. Cl.
*H04W 72/04* (2009.01)
*H04L 5/00* (2006.01)
*H04L 1/18* (2006.01)

(52) U.S. Cl.
CPC ....... *H04W 72/0446* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

2012/0257553 A1*  10/2012  Noh ................ H04L 5/0057
                                                         370/280
2014/0071954 A1    3/2014  Au
(Continued)

FOREIGN PATENT DOCUMENTS

CL       2018001451 A1    7/2018
CN       101087288 A     12/2007
(Continued)

OTHER PUBLICATIONS

Supplementary European Search Report in the European application No. 16909233.5, dated Jun. 19, 2019.
(Continued)

*Primary Examiner* — Joseph Eavellino
*Assistant Examiner* — The Hy Nguyen
(74) *Attorney, Agent, or Firm* — Ladas & Parry, LLP

(57) ABSTRACT

Provided in the embodiments are a method for signal transmission, a terminal device and a network device. The method comprises: determining, by a first device, a basic transmission interval and at least one basic numerology; and taking, by the first device, the basic transmission interval as a time domain unit and employing parameters in the at least one basic numerology to perform transmission of data and/or a pilot signal with a second device. According to the method, the terminal device and the network device provided by the embodiment, the flexibility of signal transmission can be improved.

7 Claims, 9 Drawing Sheets

(52) U.S. Cl.
CPC .......... *H04L 5/0055* (2013.01); *H04W 72/04* (2013.01); *H04L 5/0007* (2013.01)

(56) References Cited

U.S. PATENT DOCUMENTS

| | | | |
|---|---|---|---|
| 2015/0351093 A1 | 12/2015 | Au et al. | |
| 2016/0249329 A1* | 8/2016 | Au | H04W 72/042 |
| 2016/0323011 A1* | 11/2016 | Tang | H04W 72/042 |
| 2016/0352551 A1* | 12/2016 | Zhang | H04L 5/0007 |
| 2017/0164363 A1 | 6/2017 | Zhang et al. | |
| 2017/0290008 A1* | 10/2017 | Tooher | H04L 1/0007 |
| 2017/0318582 A1 | 11/2017 | Au et al. | |
| 2017/0325250 A1* | 11/2017 | Manolakos | H04L 27/2602 |
| 2018/0042038 A1* | 2/2018 | Seo | H04L 5/0053 |
| 2018/0199322 A1* | 7/2018 | Takeda | H04L 5/0053 |
| 2018/0249464 A1 | 8/2018 | Au et al. | |
| 2018/0249465 A1 | 8/2018 | Au et al. | |
| 2018/0367265 A1* | 12/2018 | Wang | H04L 5/0094 |
| 2019/0090236 A1 | 3/2019 | Au et al. | |
| 2019/0116490 A1* | 4/2019 | Chang | H04W 8/22 |
| 2019/0116616 A1* | 4/2019 | Si | H04L 5/0055 |

FOREIGN PATENT DOCUMENTS

| | | |
|---|---|---|
| CN | 101621359 A | 1/2010 |
| CN | 104468030 A | 3/2015 |
| CN | 104620629 A | 5/2015 |
| CN | 104883237 A | 9/2015 |
| CN | 105025576 A | 11/2015 |
| EP | 2661006 A2 | 11/2013 |
| EP | 2945449 A1 | 11/2015 |
| EP | 2991419 A1 | 3/2016 |
| RU | 2467514 C2 | 11/2012 |
| RU | 2485717 C2 | 6/2013 |
| RU | 2510596 C2 | 3/2014 |
| WO | 2015184707 A1 | 12/2015 |
| WO | 2016029736 A1 | 3/2016 |
| WO | 2016040290 A1 | 3/2016 |
| WO | 2018014306 A1 | 1/2018 |

OTHER PUBLICATIONS

English translation of the Written Opinion of the International Search Authority in the international application No. PCT/CN2016/090910, dated Apr. 12, 2017.
First Office Action of the Chile application No. 201900156, dated Aug. 23, 2019.
First. Office Action of the Russian application No. 2019104645, dated Dec. 5, 2019.
International Search Report in international application No. PCT/CN2016/090910 with English translation from WIPO, dated Apr. 12, 2017.
Written Opinion of the International Search Authority in international application No. PCT/CN2016/090910 with machine English translation from Google, dated Apr. 12, 2017.
First Office Action of the Chinese application No. 201680087830.X, dated Mar. 24, 2020.
First Office Action of the Singaporean application No. 11201900542R, dated Mar. 24, 2020.
Notice of Allowance of the Russian application No. 2019104645, dated Mar. 16, 2020.
Qualcomm Incorporated, "Numerology and TTI multiplexing for NR Forward Compatibility Analysis"; 3GPP TSG-RAN WG1 #85 R1-164692; May 13, 2016.
First Office Action of the Israeli application No. 264328, dated Jul. 28, 2020.
Second Office Action of the Chinese application No. 201680087830.X, dated Jul. 15, 2020.
First Office Action of the Brazilian application No. 1120190011137, dated Aug. 3, 2020.
Office Action of the Indian application No. 201917006481, dated Aug. 20, 2020.
First Office Action of the Canadian application No. 3031313, dated Dec. 19, 2019.
First Office Action of the Japanese application No. 2019-502779, dated Aug. 28, 2020.
Second Office Action of the Canadian application No. 3031313, dated Oct. 20, 2020.
Office Action of the Taiwanese application No. 106122649, dated Feb. 23, 2021.
First Office Action of the European application No. 16909233.5, dated Mar. 10, 2021.
Office Action of the Australian application No. 2016415599, dated Apr. 9, 2021.
Second Office Action of the Japanese application No. 2019-502779, dated Jun. 1, 2021.
Third Office ruction of the Chilean application No. 201900156, dated Jun. 4, 2021.
Third Office Action of the Canadian application No. 3031313, dated Aug. 24, 2021.
Second Office Action of the Israeli application No. 264328, dated Aug. 24, 2021.
3GPP TSG RAN WG1 Meeting #84bis RI-162386, Busan, Korea Apr. 11-15, 2016, Source: Intel Corporation, Title: Numerology for new radio interface, Agenda item: 8.1.5, Document for: Discussion/Decision, entire document.
3GPP TSG RAN WG1 Meeting #84bis R1-162156, Busan, Korea, Apr. 11-15, 2016, Agenda Item: 8.1.5, Source Huawei, HiSilicon, Title: Scenario & design criteria on flexible numerologies. Document for: Discussion and decision, entire document.
Second Office Action of the Australian application No. 2016415599, dated Sep. 7, 2021.
First Office Action of the Indonesian application No. P00201901562, dated October 5, 2 021.
Second Written Opinion of the Singaporean application No. 11201900542R, dated Nov. 1, 2021.

* cited by examiner

METHOD FOR SIGNAL TRANSMISSION, TERMINAL DEVICE AND NETWORK DEVICE

CROSS-REFERENCE TO RELATED APPLICATION

The present application is the U.S. national phase application of PCT Application No. PCT/CN2016/090910 filed on Jul. 21, 2016, the disclosure of which is incorporated herein in its entirety by reference.

TECHNICAL FIELD

The disclosure relates to the field of communications, and particularly relates to a method for transmitting a signal, a terminal device and a network device.

BACKGROUND

Along with continuous evolution of a wireless communication technology, a service type in a Long Term Evolution (LTE) is single, namely, a fixed sub-carrier width or a single sub-carrier width is used, so that the optimization cannot be performed on all services. Therefore, a novel method for transmitting a signal that can improve the flexibility of signal transmission is required urgently.

SUMMARY

In view of this, the embodiments of the disclosure provide a method for transmitting a signal, a terminal device and a network device, which can improve the flexibility of signal transmission.

A first aspect provides a method for transmitting a signal, which includes: a first device determines a basic transmission interval and at least one basic numerology; and the first device takes the basic transmission interval as a time domain unit and employs parameters in the at least one basic numerology to perform transmission of at least one of data or a pilot signal with a second device.

Under a condition in which multiple numerologies are supported, a novel method for transmitting the signal is disclosed and can keep the flexibility of signal transmission.

Optionally, if the first device determines one basic numerology, the basic transmission interval may be the time length of a basic transmission interval determined by parameters in the basic numerology; and if the first device determines multiple basic numerologies, the basic transmission interval may be a fixed time length determined by parameters in the multiple basic numerologies.

In combination with the first aspect, in a first possible implementation manner of the first aspect, that a first device determines at least one basic numerology includes: the first device determines the at least one basic numerology from multiple basic numerologies.

Optionally, the multiple basic numerologies may be configured in the first device, may also be configured in the second device communicating with the first device, and may further be basic numerologies determined by the first device according to own transmission parameters (such as a working frequency point), or basic numerologies appointed in advance and stored in the first device or the second device.

Under a condition in which multiple basic numerologies exist, the first device may only select one basic numerology to perform signal transmission with other devices and thus may guarantee that an appropriate detection window or sending window is provided for a signal transmitted by the first device; and the first device may further take a determined basic transmission interval as the detection window or sending window for the signal transmitted by the first device when multiple basic numerologies are selected, and simultaneously also may perform interference coordination well among different cells of different basic numerologies.

In combination with the first aspect or any implementation manner of the first aspect, in a second possible implementation manner of the first aspect, that the first device takes the basic transmission interval as a time domain unit and employs parameters in the at least one basic numerology to perform transmission of at least one of data or a pilot signal with a second device includes: the first device determines a time length corresponding to a transmission time unit in each basic numerology in the at least one basic numerology according to the at least one basic numerology; the first device determines the number of transmission time units corresponding to the each basic numerology according to the basic transmission interval as well as the time length corresponding to the transmission time unit in the each basic numerology, the number of transmission time units being the number of transmission time units in the basic transmission interval; and the first device respectively takes the number of transmission time units corresponding to the each basic numerology as a time domain unit to perform the transmission of at least one of the data or the pilot signal with the second device.

The transmission time unit is a time domain resource unit for transmitting the signal. It may be a transmission time unit defined in an LTE system such as a Transmission Time Interval (TTI), a sub-frame, a wireless frame, and an Orthogonal Frequency Division Multiplexing (OFDM) symbol, and may also be a transmission time unit newly defined in a 5th-Generation (5G) system.

Generally, the signal is transmitted by taking one transmission time unit as a basic transmission unit, such as taking one TTI as the basic transmission unit and thus it is assured that a duration for transmission of each signal is an integer multiple of the transmission time unit. Similarly, in the embodiments of the disclosure, the number of transmission time units in the basic transmission interval is taken as the time domain unit; that is, the number of transmission time units used for each time of transmission is an integer multiple of the number of transmission time units in the basic transmission interval.

In combination with the first aspect or any implementation manner of the first aspect, in a third possible implementation manner of the first aspect, that a first device determines a basic transmission interval includes: the first device determines the basic transmission interval according to stored preset information; or the first device determines the basic transmission interval according to a received control signaling sent by the second device, the control signaling being used for indicating the basic transmission interval.

In combination with the first aspect or any implementation manner of the first aspect, in a fourth possible implementation manner of the first aspect, after the first device determines the basic transmission interval, the method further includes: the first device sends a control signaling to the second device, so that the second device determines the basic transmission interval according to the control signaling.

The first device may be a terminal device and may also be a network side device. The second device may be the terminal device and may also be the network side device. The first device may be a receiving terminal and may also be a sending terminal.

Typically, the first device is the terminal device and the second device is the network side device. The control signaling may be a downlink control signaling. The downlink control signaling may indicate one of multiple appointed basic transmission intervals.

In combination with the first aspect or any implementation manner of the first aspect, in a fifth possible implementation manner of the first aspect, a time difference between a transmission time unit occupied by a scheduling signaling for scheduling at least one of the data or the pilot signal and a transmission time unit occupied by at least one of the data or the pilot signal sent or received by the first device is a positive integer multiple of the basic transmission interval.

In combination with the first aspect or any implementation manner of the first aspect, in a sixth possible implementation manner of the first aspect, a time difference between a transmission time unit occupied by the data sent by the first device and a transmission time unit occupied by corresponding Acknowledgement (ACK)/Negative Acknowledgement (NACK) feedback information received by the first device is a positive integer multiple of the basic transmission interval, or a time difference between a transmission time unit occupied by the data received by the first device and a transmission time unit occupied by the corresponding ACK/NACK feedback information sent by the first device is a positive integer multiple of the basic transmission interval.

In combination with the first aspect or any implementation manner of the first aspect, in a seventh possible implementation manner of the first aspect, the method further includes: the first device sends the ACK/NACK feedback information, the ACK/NACK feedback information being ACK/NACK feedback information corresponding to all data transmission blocks received by the first device in a single basic transmission interval; or the first device receives the ACK/NACK feedback information, the ACK/NACK feedback information being ACK/NACK feedback information corresponding to all data transmission blocks sent by the first device in the single basic transmission interval.

In combination with the first aspect or any implementation manner of the first aspect, in an eighth possible implementation manner of the first aspect, before the first device takes the basic transmission interval as the time domain unit and employs the parameters in the at least one basic numerology to perform the transmission of at least one of the data or the pilot signal with the second device, the method further includes: the first device schedules data transmission blocks in the single basic transmission interval according to the received scheduling signaling sent by the second device.

In combination with the first aspect or any implementation manner of the first aspect, in a ninth possible implementation manner of the first aspect, before the first device takes the basic transmission interval as the time domain unit and employs the parameters in the at least one basic numerology to perform the transmission of at least one of the data or the pilot signal with the second device, the method further includes: the first device sends the scheduling signaling to the second device, the scheduling signaling being used for scheduling the data transmission blocks in the single basic transmission interval.

In combination with the first aspect or any implementation manner of the first aspect, in a tenth possible implementation manner of the first aspect, the basic numerology includes at least one parameter of the followings: a sub-carrier spacing, the number of sub-carriers corresponding to a system bandwidth, the number of sub-carriers corresponding to a Physical Resource Block (PRB), the length of an OFDM symbol, the number of points of Fast Fourier Transformation (FFT) or Inverse Fast Fourier Transform (IFFT) used for generating an OFDM signal, the number of OFDM symbols included in a TTI, the number of TTIs included within a first time period and the length of a signal prefix.

In combination with the first aspect or any implementation manner of the first aspect, in an eleventh possible implementation manner of the first aspect, the basic transmission interval is positive integer multiple of 1 millisecond (ms).

In combination with the first aspect or any implementation manner of the first aspect, in a twelfth possible implementation manner of the first aspect, different basic transmission intervals are used for the data and the pilot signal.

A second aspect provides a terminal device, which is configured to execute the method in the first aspect or in any implementation manner of the first aspect. Specifically, the apparatus includes a unit configured to execute the method in the first aspect or above any implementation manner of the first aspect.

A third aspect provides a network device, which is configured to execute the method in the first aspect or in any implementation manner of the first aspect. Specifically, the apparatus includes a unit configured to execute the method in the first aspect or above any implementation manner of the first aspect.

A fourth aspect provides a terminal device, which includes a memory, a processor, an input/output interface, a communication interface and a bus system. Herein, the memory, the processor, the input/output interface and the communication interface are connected via the bus system; the memory is configured to store an instruction; the processor is configured to execute the instruction stored by the memory; and when the instruction is executed, the processor executes the method in the first aspect via the communication interface, and controls the input/output interface to receive input data and information and output data such as an operation result.

A fifth aspect provides a network device, which includes a memory, a processor, an input/output interface, a communication interface and a bus system. Herein, the memory, the processor, the input/output interface and the communication interface are connected via the bus system; the memory is configured to store an instruction; the processor is configured to execute the instruction stored by the memory; and when the instruction is executed, the processor executes the method in the first aspect via the communication interface, and controls the input/output interface to receive input data and information and output data such as an operation result.

A sixth aspect provides a computer storage medium, which is configured to store a computer software instruction used by the above method and includes a program designed for executing the above aspects.

In the disclosure, the names of the terminal device and the network device are not intended to form limits to the devices in itself. During actual implementation, these devices may appear in other names. As long as a function of each device is similar to the disclosure, all pertain to the scope of claims of the disclosure and equivalent technologies thereof.

These aspects or other aspects of the disclosure will become more readable in the description of the following embodiments.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

Figure 1:
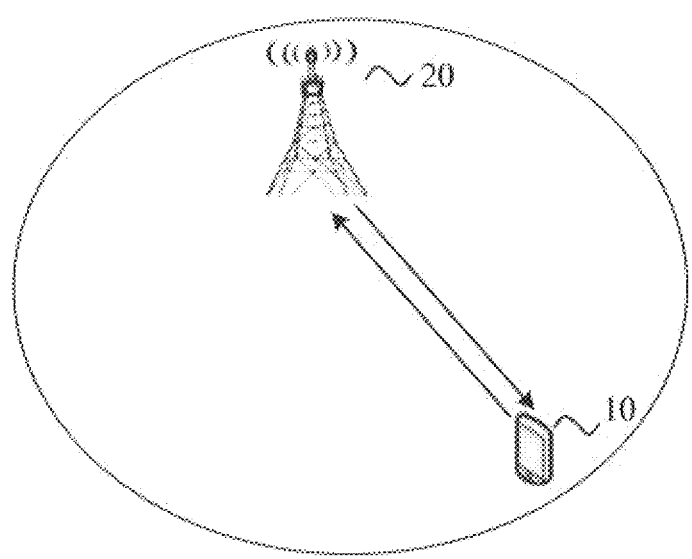
FIG. 1 illustrates a schematic diagram of a possible application scene provided by an embodiment of the disclosure.

A clear and complete description of the technical solutions in the disclosure will be given below, in combination with the accompanying drawings in the embodiments of the disclosure. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

It should be understood that the technical solutions of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system or a future 5G system.

Particularly, the technical solutions in the embodiments of the disclosure may be applied to various communication systems based on a non-orthogonal multiple access technology, such as a Sparse Code Multiple Access (SCMA) system and a Low Density Signature (LDS) system. Of course, the SCMA system and the LDS system may also be referred to as other names in the field of communications. Further, the technical solutions in the embodiments of the disclosure may be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system and a Filtered-OFDM (F-OFDM) system.

The first device in the embodiments of the disclosure may be a network side device, and may also be a terminal device. The second device may be the network side device, and may also be the terminal device. Typically, the first device is the terminal device, and the second device is the network side device.

The terminal device in the embodiments of the disclosure may be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, a terminal device in a future 5th Generation (5G) network or a terminal device in a future evolved Public Land Mobile Network (PLMN), all of which are not limited in the embodiments of the disclosure.

The network device in the embodiments of the disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene; or the network device may be a relay station, an access point, a vehicle-amounted device, a wearable device as well as a network device in the future 5G system or a network device in the future evolved PLMN network, all of which are not limited in the embodiments of the disclosure.

FIG. 1 is a schematic diagram of an application scene of the disclosure. The communication system in FIG. 1 may include a terminal device 10 and a network device 20. The network device 20 is configured to provide a communication service for the terminal device 10 and is accessed to a core network. The terminal device 10 is accessed to a network via a synchronization signal, a broadcasting signal and the like sent by a search network device 20 and thus performs communication with the network. The arrow shown in FIG. 1 may represent uplink/downlink transmission performed via a cellular link between the terminal device 10 and the network device 20.

Figure 2:
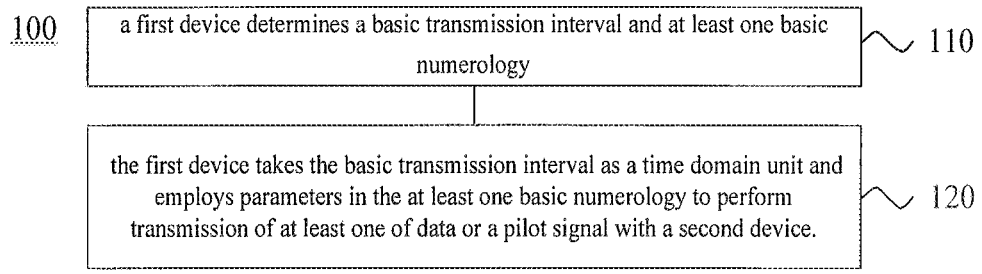
FIG. 2 illustrates a schematic block diagram of a method for transmitting a signal provided by an embodiment of the disclosure.

FIG. 2 illustrates a schematic flowchart of a method for transmitting a signal provided by an embodiment of the disclosure. As shown in FIG. 2, the method 100 includes the following operations.

At 110, a first device determines a basic transmission interval and at least one basic numerology.

At 120, the first device takes the basic transmission interval as a time domain unit and employs parameters in the at least one basic numerology to perform transmission of data and/or a pilot signal with a second device.

First of all, it is necessary to explain the following several points.

1. The data and/or the pilot signal may be an uplink data and/or pilot signal, and may also be a downlink data and/or pilot signal.

2. The basic transmission interval may be an absolute time length, such as the time length with second, millisecond or microsecond as a unit. Typically, it is a positive integer multiple of 1 millisecond (ms).

3. The transmission of the data and/or the pilot signal with the basic transmission interval as the time domain unit refers to that a duration that the first device receives or sends the signal at each time should be a positive integer multiple of the basic transmission interval.

4. The first device may be the network side device and may also be the terminal device. It may be the receiving terminal and may also be the sending terminal. For the convenience of description, a following description will be given with the first device being the terminal device and the second device being the network device as an example.

Along with the continuous evolution of a communication technology, diversified service types are required in a future communication system and the communication requirement cannot be met by the single sub-carrier width in the LTE system. Different from the LTE system, in order to keep the flexibility and the forward compatibility of a system, multiple basic numerologies may coexist in a manner of Time-Division Multiplexing (TDM) or Frequency-Division Multiplexing (FDM) or a combination thereof in a carrier/cell/Transmit Receive Point (TRP) of a future wireless communication system such as 5G. Generally, different carrier intervals are adopted by different numerologies. As a result, the time lengths of transmission time units of different numerologies on a time domain also differ from each other. There is a need for a novel method for transmitting the signal in the future wireless communication system such as 5G so as to improve the flexibility of signal transmission.

Optionally, the above basic numerologies may include at least one of the following parameters.

A sub-carrier spacing, the number of sub-carriers under a special bandwidth, the number of sub-carriers in a Physical Resource Block (PRB), the length of an OFDM symbol, the number of points of Fourier Transform (such as Fast Fourier Transform, referred to as FFT) or inverse Fourier transform (such as Inverse Fast Fourier Transform, referred to as IFFT) used for generating an OFDM signal, the number of OFDM symbols in a TTI, the number of TTIs included in a special time length and the length of a signal prefix.

Herein, the sub-carrier spacing refers to a frequency interval between adjacent sub-carriers, such as 15 kHz and 60 kHz. The number of sub-carriers under the special bandwidth may be, for example, the number of sub-carriers corresponding to each possible system bandwidth. The number of sub-carriers in the PRB typically may be, for example, an integer multiple of 12. The number of OFDM symbols in the TTI may be, for example, an integer multiple of 14; the number of TIs included within a special time period may refer to the number of TTIs included in the time length of 1 ms or 10 ms. The length of the signal prefix may be, for example, the time length of a Cyclic Prefix (CP) of a signal, or whether the CP employs a conventional CP or an extended CP or not.

In this embodiment, the terminal device may determine a basic numerology, may determine the time length corresponding to a transmission time unit in the basic numerology upon the determination of a fixed basic numerology and then determines the time length as the basic transmission interval in the method 100, so that data and/or a pilot signal may be sent or received with the time length corresponding to the basic transmission unit as a time domain length. Furthermore, the terminal device may determine multiple basic numerologies, and determines a fixed time length as the basic transmission interval in the method 100 upon the determination of the multiple numerologies, so that the data and/or the pilot signal is sent or received by using the multiple basic numerologies.

It should be understood that, the basic numerology or the multiple basic numerologies may be determined by the terminal device according to own transmission parameters (such as a working frequency point), may also be selected from multiple basic numerologies configured in the terminal device, may further be appointed by the terminal device and the network device in advance, and may further be the basic numerologies selected by the network device from multiple basic numerologies configured in the network device and notified to the terminal device, etc., in which the manner that the terminal device acquires the basic numerologies is not defined in the disclosure.

It should further be understood that, the basic transmission interval may include at least one transmission time unit and the transmission time unit is a time domain resource unit for transmitting the signal. For example, it may be the OFDM symbol, may be a transmission time unit defined in the LTE system such as the TTI and the sub-frame, and may further be a transmission time unit newly defined in the future wireless communication system such as the 5G.

For example, if the terminal device only appoints one basic numerology to transmit data with other devices (such as the network device), since the same basic numerology is adopted, a sending window or a detection window adopted by the terminal device to send the data or receive the data is uniform and thus the complexity in transmission is not increased. Moreover, if cells where the other devices communicating with the terminal device are located are different cells, when the other devices transmit the data to the terminal device simultaneously, since the same numerology is adopted, the problem that the interference coordination among the cells is affected to increase the inter-cell interference is not occurred.

For example, if the terminal device appoints multiple basic numerologies to transmit data with other devices (such as the network device), since the uniform basic transmission interval is adopted, a sending window or a detection window adopted by the terminal device to send the data or receive the data is the same and thus the complexity in transmission is not increased. Moreover, if cells where the other devices communicating with the terminal device are located are different cells, when the other devices transmit the data to the terminal device simultaneously, since the uniform basic transmission interval is adopted, the problem that the interference coordination among the cells is affected to increase the inter-cell interference is not occurred.

Optionally, the basic transmission interval may be appointed by the terminal device and the network device in advance. Or multiple basic transmission intervals are appointed by the terminal device and the network device in advance and are configured in the terminal device or the network device. When the data and/or the pilot signal needs to be transmitted between the terminal device and the network device, the network device may select one basic transmission interval from the multiple basic transmission intervals appointed in advance and sends a control signaling to the terminal device, so that the terminal device determines a basic transmission interval according to the control signaling. The multiple basic transmission intervals may be determined by the network device according to the multiple numerologies configured inside. For example, the time length of the transmission time unit corresponding to the first basic numerology is 0.5 ms, the time length of the transmission time unit corresponding to the second basic numerology is 1.0 ms and the time length of the transmission time unit corresponding to the third basic numerology is 1.5 ms, so that the network device may determine the basic transmission interval according to the time lengths of the transmission time units respectively corresponding to the first basic numerology, the second numerology and the third numerology, in which the basic transmission interval may be a common multiple such as 3 ms and may also be two times of the common multiple such as 6 ms, etc. Any manner for selecting the basic transmission interval may be appropriate. For example, the basic transmission interval is a positive integer multiple of the time lengths of the transmission time units corresponding to the determined multiple basic numerologies.

Optionally, as an embodiment, that the first device takes the basic transmission interval as a time domain unit and employs parameters in the at least one basic numerology to perform transmission of data and/or a pilot signal with a second device includes: the first device determines the time lengths corresponding to transmission time units in each basic numerology in the at least one basic numerology according to the at least one basic numerology; the first device determines the number of transmission time units corresponding to the each basic numerology according to the basic transmission interval as well as the time lengths corresponding to the transmission time units in the each basic numerology, the number of transmission time units being the number of transmission time units in the basic transmission interval; and the first device respectively takes the number of transmission time units corresponding to the each basic numerology as a time domain unit to perform the transmission of the data and/or the pilot signal with the second device.

Specifically, the above basic numerology may include at least one resource parameter for determining a time frequency resource to transmit the data. A corresponding relationship between the parameters in the above basic numerology and the time length of the transmission time unit is appointed by the terminal device and the network device in advance. Or, the time length of the transmission time unit is calculated via the parameters in the above basic numerology. For example, when the above basic numerology includes the sub-carrier spacing, the relationship therebetween may be appointed in advance and may be appointed as that the sub-carrier spacing is 15 kHz and the time length corresponding to one TTI is 1 ms. Also for example, the transmission time unit is the TTI and the length of the OFDM symbol in the basic numerology is L. If one TTI includes K OFDM symbols, the time length of the one TTI is K*L. If the determined basic transmission interval is T and the time length of one transmission time unit is t, the number of transmission time units in the basic transmission interval is N=T/t by rounding. In general, when the basic TTI is appointed, the basic transmission interval is a positive integer multiple of the time lengths corresponding to the transmission time units in the basic numerology. Whenever the terminal device transmits the data and/or the pilot signal, there is a need to at least send or receive the corresponding number of transmission time units. In other words, the consecutive number of transmission time units when the terminal device sends or receives the data and/or the pilot signal should be a positive integer multiple of the number of the transmission time units.

Generally, the signal is transmitted by taking one transmission time unit as a time domain unit, such as taking one TTI as the time domain unit and thus it is assured that a duration for transmission of each signal is an integer multiple of the transmission time unit. Similarly, in this embodiment of the disclosure, the number of transmission time units in the basic transmission interval is taken as the time domain unit.

Optionally, a time difference between a transmission time unit occupied by a scheduling signaling received by the first device for scheduling the data and/or the pilot signal and a transmission time unit occupied by the data and/or the pilot signal sent or received by the first device is a positive integer multiple of the basic transmission interval. A time difference between a transmission time unit occupied by a scheduling signaling sent by the first device for scheduling the data and/or the pilot signal and a transmission time unit occupied by the data and/or the pilot signal sent or received by the first device is a positive integer multiple of the basic transmission interval.

Optionally, a time difference between a transmission time unit occupied by the data sent by the first device and a transmission time unit occupied by corresponding ACK/NACK feedback information received by the first device is a positive integer multiple of the basic transmission interval, or a time difference between a transmission time unit occupied by the data received by the first device and a transmission time unit occupied by the corresponding ACK/NACK feedback information sent by the first device is a positive integer multiple of the basic transmission interval.

Figure 3:
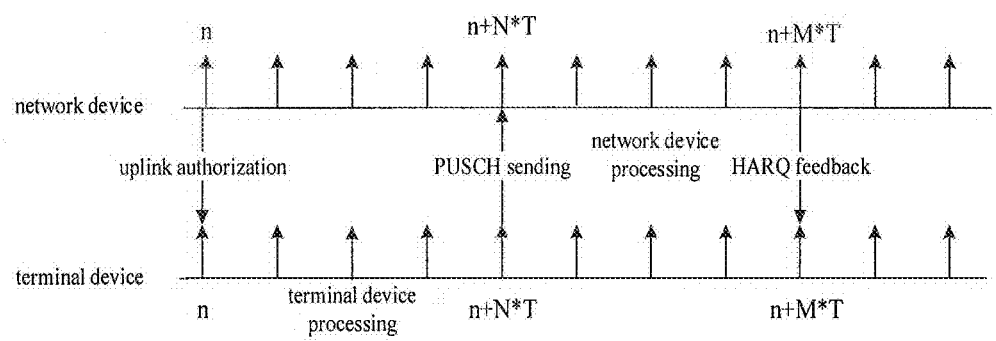
FIG. 3 illustrates a schematic diagram of an air interface time sequence provided by an embodiment of the disclosure.

Specifically, as shown in FIG. 3, it is assumed that the transmission time unit is the sub-frame, the basic transmission interval is T and the network device sends an uplink authorization at an nth sub-frame, the terminal device starts to schedule preparation data upon the reception of the uplink authorization at the nth sub-frame and starts to send the data at an (n+N*T)th sub-frame; and meanwhile, the network device detects and checks the data sent by the terminal device at the (n+N*T)th sub-frame and feeds a check result back to the terminal device at the (n+M*T)th sub-frame. Herein, the M and the N are a positive integer respectively and M>N.

In the LTE system, the network device controls the uplink sending of the terminal device via the uplink authorization (the uplink authorization information includes information such as the magnitude of a distributed air interface resource, a new retransmission indication and a sending time) and defines an uplink sending time sequence explicitly. By taking a Frequency Division Duplexing (FDD) air interface time sequence as an example, the network device sends the uplink authorization at the nth sub-frame, and the terminal device starts to schedule the preparation data upon the reception of the uplink authorization at the nth sub-frame and must starts to send the data at the (n+4) sub-frame; and the network device detects and checks the data sent by the terminal device at the (n+4) sub-frame and feeds a check result to the terminal device at the (n+8)th sub-frame.

Optionally, the method further includes: the first device sends the ACK/NACK feedback information, the ACK/NACK feedback information being ACK/NACK feedback information corresponding to all data transmission blocks received by the first device in a single basic transmission interval; or the first device receives the ACK/NACK feedback information, the ACK/NACK feedback information being ACK/NACK feedback information corresponding to all data transmission blocks sent by the first device in the single basic transmission interval.

Specifically, concerning N downlink data transmission blocks transmitted in the single basic transmission interval, the terminal device may feed the ACK/NACK back by employing an ACK binding manner, that is, the ACK is fed back only when the N transmission blocks are correct, or otherwise, the NACK is fed back. The terminal device may also feed the ACK/NACK back by employing a bitmap manner, that is, N bits of ACK/NACK are fed back and each bit corresponds to one transmission block in the N transmission blocks.

Optionally, before the first device takes the basic transmission interval as the time domain unit and employs the parameters in the at least one basic numerology to perform the transmission of the data and/or the pilot signal with the second device, the method further includes: the first device receives a scheduling signaling sent by the second device, the scheduling signaling being used for scheduling data transmission blocks in the single basic transmission interval, or the first device sends the scheduling signaling to the second device, the scheduling signaling being used for scheduling the data transmission blocks in the single basic transmission interval.

Specifically, one scheduling signaling may be used for scheduling parts or all of the data transmission blocks in the single basic transmission interval. With respect to downlink transmission, the terminal device detects all data transmission blocks in the basic transmission interval based on the scheduling signaling and the network device sends the all data transmission blocks in the basic transmission interval based on the scheduling signaling. With respect to uplink transmission, the terminal device sends all data transmission blocks in the basic transmission interval based on the scheduling signaling and the network device detects the all data transmission blocks in the basic transmission interval based on the scheduling signaling.

Optionally, different basic transmission intervals may be adopted by the data and the pilot signal. For example, the basic transmission interval adopted to transmit the data is 1 ms and that adopted to transmit the pilot signal is 1/14 ms.

In order to understand conveniently, the methods 400 and 500 for transmitting the signal provided by the embodiments of the disclosure will be described below in detail.

Figure 4:
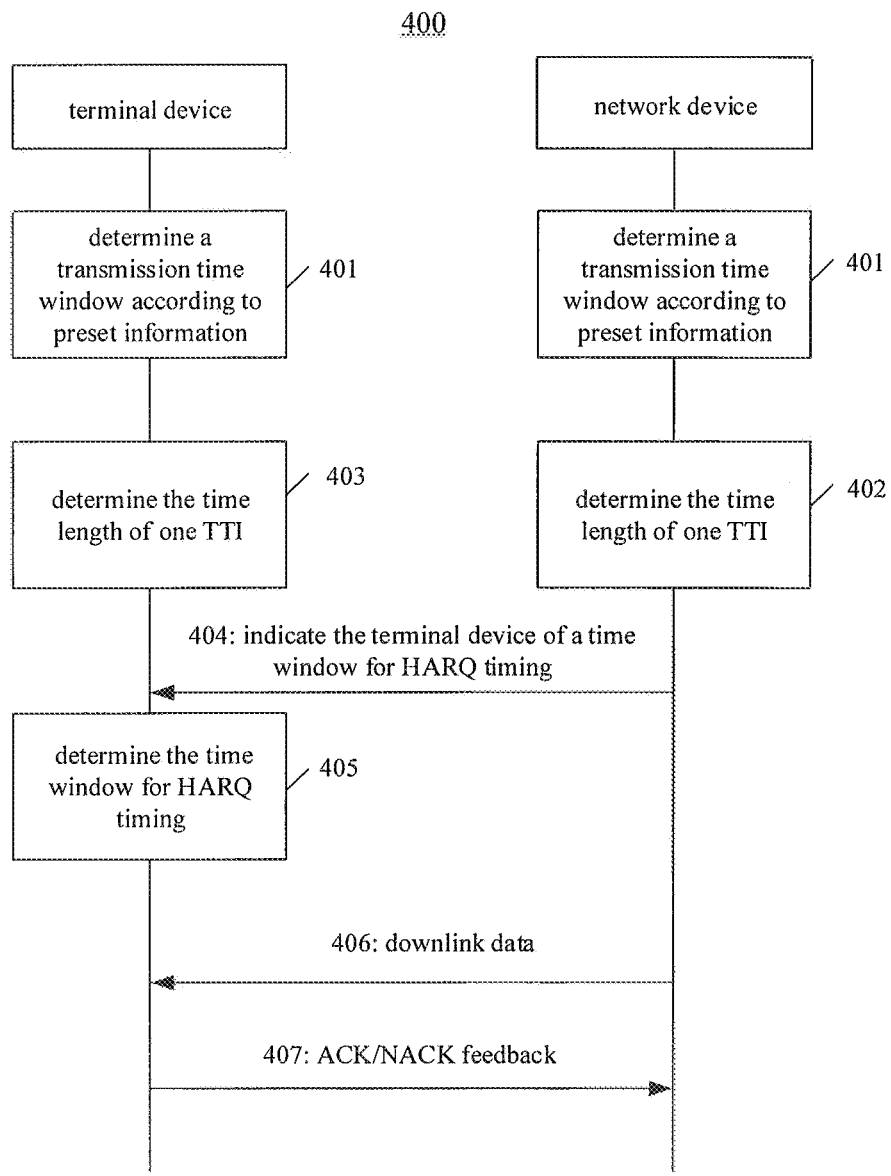
FIG. 4 illustrates a flowchart of a method for transmitting a signal provided by an embodiment of the disclosure.

As shown in FIG. 4, the specific operations of the method 400 are as follows.

At 401, a network device and a terminal device appoint the magnitude of a transmission time window (namely, a basic transmission interval) in advance. For example, the transmission time window is 1 ms.

At 402, the network device determines the time length of one TTI according to a sub-carrier spacing adopted for data transmission and thus determines the number of TTIs included in one transmission time window. Herein, the corresponding relationship between the sub-carrier spacing and the length of the one TTI is appointed in advance. For example, the sub-carrier spacing is 15 kHz and the time length of the corresponding one TTI is 1 ms, so that one transmission time window only includes one TTI.

At 403, the terminal device determines the time length of one TTI according to the sub-carrier spacing adopted for the data transmission and thus determines the number of TTIs included in the transmission time window. Specifically, the process herein is the same as the process of the network device.

At 404, the network device indicates the terminal device of the magnitude of a time window for Hybrid Automatic Repeat request (HARQ) timing, namely, a time delayed by the ACK/NACK feedback compared with the data transmission, in which the time takes the transmission time window as the unit.

At 405, the terminal device receives an indication of the network device and thus determines the magnitude of the time window for the HARQ timing, in which the time window takes the transmission time window as the unit. For example, the network device indicates that the magnitude of the time window for the HARQ timing is 4, which expresses that the ACK/NACK feedback is delayed for 4 transmission time windows, namely, 4 TTIs compared with the data transmission.

At 406, the network device performs transmission of downlink data by taking one transmission time window (namely, one TTI) as a time domain unit, in which each transmission time window transmits one transmission block and each transmission block is provided with an independent HARQ process.

At 407, the terminal device performs reception of the downlink data by taking one transmission time window (namely, one TTI) as a time domain unit, in which the transmission blocks sent by the network device are respectively detected in each transmission time window. Upon the detection of the downlink data, the terminal device delays for 4 TTIs to perform corresponding ACK/NACK feedback.

Figure 5:
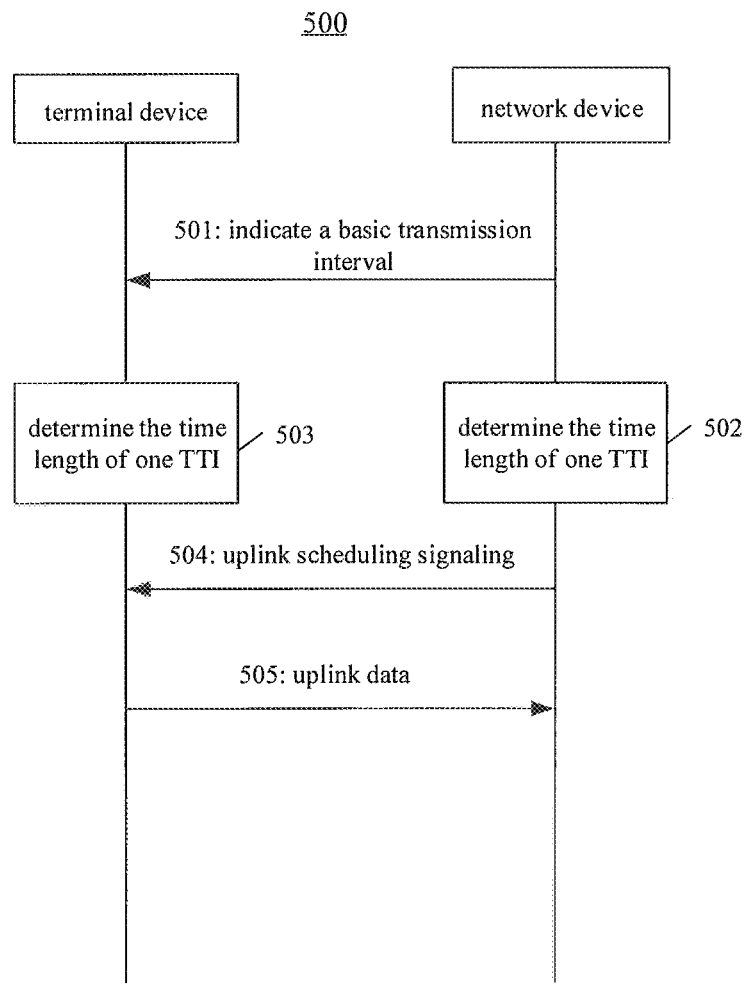
FIG. 5 illustrates another flowchart of a method for transmitting a signal provided by an embodiment of the disclosure.

As shown in FIG. 5, the specific operations of the method 500 are as follows.

At 501, a network device indicates a terminal device of the magnitude of a basic transmission interval via a high-level signaling. Herein, the network device indicates the terminal device which basic transmission interval may be used by employing a 2-bit signaling. The four basic transmission intervals corresponding to 2-bit information are 1 ms, 2 ms, 4 ms and 8 ms respectively. The four basic transmission intervals are appointed between the terminal device and the network device in advance, and it is assumed that the basic transmission interval indicated by the network device is 2 ms.

At 502, the network device determines the time length of one sub-frame according to the length of an OFDM symbol in a basic numerology adopted for data transmission and thus determines the number of sub-frames included in the indicated basic transmission interval.

At 503, same as the network device, the terminal device determines the time length of one sub-frame according to the length of the OFDM symbol in the basic numerology adopted for the data transmission and thus determines the number of sub-frames included in the basic transmission interval. It is assumed that the length of the OFDM symbol is 1/14 ms and one sub-frame includes 14 OFDM symbols, the time length of the one sub-frame is 1 ms. At this moment, one basic transmission interval includes two sub-frames.

At 504, the terminal device and the network device appoint timing for uplink data scheduling, that is, the number of basic transmission intervals spaced between an uplink scheduling signaling and corresponding data transmission. Herein, it is assumed that two basic transmission intervals (namely, the time length of four sub-frames) are spaced therebetween.

At 505, upon the reception of the scheduling signaling of the network device, the terminal device delays for the time lengths of four sub-frames and takes two sub-frames as a time domain unit to perform transmission of uplink data, in which each sub-frame transmits one transmission block, that is, at least two transmission blocks are transmitted by the terminal device at each time.

It should be understood that, in each embodiment of the disclosure, sequence numbers of the foregoing operations do not mean execution sequences. The execution sequences of the operations should be determined according to functions and internal logic of the operations, and should not be construed as any limitation on the implementation processes of the embodiments of the disclosure.

It should be understood further that, the first embodiment and the second embodiment illustrate the detailed steps or operations of the method for transmitting the signal. However, these actions or operations are merely for example, and other operations or variations of each operation may further be performed by the embodiments of the disclosure. In addition, the each operation in the first embodiment and the second embodiment may be executed according to different sequences and it is possible that not all of the operations in the first embodiment and the second embodiment are executed necessarily.

The method for transmitting the signal according to the embodiments of the disclosure is described above in detail in combination with FIG. 2 to FIG. 5. Hereinafter, the apparatus for transmitting the signal according to the embodiments of the disclosure will be described in detail in combination with FIG. 6 to FIG. 9, and the technical characteristics described in the method embodiments may be applied to the following apparatus embodiments.

Figure 6:
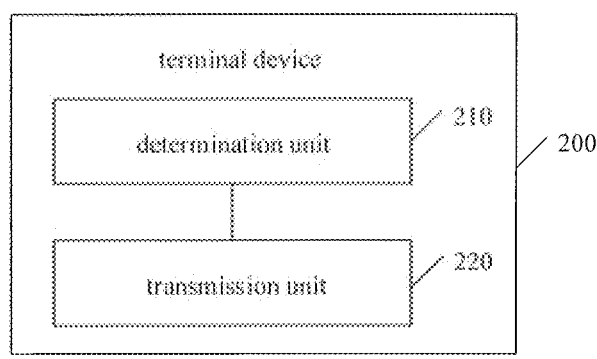
FIG. 6 illustrates a schematic block diagram of a terminal device for transmitting a signal provided by an embodiment of the disclosure.

FIG. 6 illustrates a schematic block diagram of a terminal device 200 for transmitting a signal provided by an embodiment of the disclosure. As shown in FIG. 6, the terminal device 200 includes a determination unit 210 and a transmission unit 220.

The determination unit 210 is configured to determine a basic transmission interval and at least one basic numerology.

The transmission unit 220 is configured to take the basic transmission interval as a time domain unit and employ parameters in the at least one basic numerology to perform transmission of data and/or a pilot signal with a network device or a second terminal device.

Specifically, the terminal device may determine a basic numerology, may determine the time length corresponding to a transmission time unit in the basic numerology upon the determination of a fixed basic numerology and then determines the time length as the basic transmission interval in the method 100, so that data and/or a pilot signal may be sent or received with the time length corresponding to the basic transmission unit as a time domain length. Furthermore, the terminal device may determine multiple basic numerologies, and determines a fixed time length as the basic transmission interval in the method 100 upon the determination of the multiple numerologies, so that the data and/or the pilot signal is sent or received by using the multiple basic numerologies.

According to this embodiment of the disclosure, a novel terminal device for transmitting the signal is provided and can improve the flexibility of signal transmission.

It should be understood that, the basic numerology or the multiple basic numerologies may be determined by the terminal device according to own transmission parameters (such as a working frequency point), may also be selected from multiple basic numerologies configured in the terminal device, may further be appointed by the terminal device and the network device in advance, and may further be the basic numerologies selected by the network device from multiple basic numerologies configured in the network device and notified to the terminal device, etc., in which the manner that the terminal device acquires the basic numerologies is not defined in the disclosure.

Under a condition in which multiple basic numerologies exist, the terminal device may only select one basic numerology to perform signal transmission with the network device and thus may guarantee that an appropriate detection window or sending window is provided for a signal transmitted by the terminal device; and the terminal device may further take a determined basic transmission interval as the detection window or sending window for the signal transmitted by the terminal device when multiple basic numerologies are selected, and simultaneously also may perform interference coordination well among different cells of different basic numerologies.

Optionally, as an embodiment, the transmission unit is specifically configured to determine the time lengths corresponding to transmission time units in each basic numerology in the at least one basic numerology according to the at least one basic numerology; determine the number of transmission time units corresponding to the each basic numerology according to the basic transmission interval as well as the time lengths corresponding to the transmission time units in the each basic numerology, the number of transmission time units being the number of transmission time units in the basic transmission interval; and respectively take the number of transmission time units corresponding to the each basic numerology as a time domain unit to perform the transmission of the data and/or the pilot signal with the network device or the second device.

Optionally, as an embodiment, the determination unit is specifically configured to determine the basic transmission interval according to the stored preset information; or determine the basic transmission interval according to the received control signaling sent by the network device, the control signaling being used for indicating the basic transmission interval.

Optionally, as an embodiment, the terminal device further includes a sending unit.

The sending unit is configured to send a control signaling to the network device or the second terminal device, so that the network device or the second terminal device determines the basic transmission interval according to the control signaling.

Optionally, as an embodiment, a time difference between a transmission time unit occupied by a scheduling signaling for scheduling the data and/or the pilot signal and a transmission time unit occupied by the data and/or the pilot signal sent or received by the first device is a positive integer multiple of the basic transmission interval.

Optionally, as an embodiment, a time difference between a transmission time unit occupied by the data sent by the terminal device and a transmission time unit occupied by corresponding ACK/NACK feedback information received by the terminal device is a positive integer multiple of the basic transmission interval, or a time difference between a transmission time unit occupied by the data received by the terminal device and a transmission time unit occupied by the corresponding ACK/NACK feedback information sent by the terminal device is a positive integer multiple of the basic transmission interval.

Optionally, as an embodiment, the terminal device further includes a second sending unit or a first receiving unit.

The second sending unit is configured to send the ACK/NACK feedback information, the ACK/NACK feedback information being ACK/NACK feedback information corresponding to all data transmission blocks received by the device in a single basic transmission interval.

The first sending unit is configured to receive the ACK/NACK feedback information, the ACK/NACK feedback information being ACK/NACK feedback information corresponding to all data transmission blocks sent by the device in the single basic transmission interval.

Optionally, as an embodiment, the terminal device further includes a second receiving unit.

The second receiving unit is configured to receive a scheduling signaling sent by the network device or the second terminal device, the scheduling signaling being used for scheduling data transmission blocks in the single basic transmission interval.

Optionally, as an embodiment, the terminal device further includes a third sending unit.

The third sending unit is configured to send the scheduling signaling to the network device or the second terminal device, the scheduling signaling being used for scheduling the data transmission blocks in the single basic transmission interval.

It should be understood that, the terminal device 200 according to the embodiments of the disclosure may correspond to an execution main body of the method 100 for transmitting the signal in the embodiments of the disclosure. Furthermore, the above and other operations and/or functions of each module in the terminal device 200 are intended to implement a corresponding process of each method in FIG. 2 and FIG. 5 and will not be repeated for the conciseness.

Figure 7:
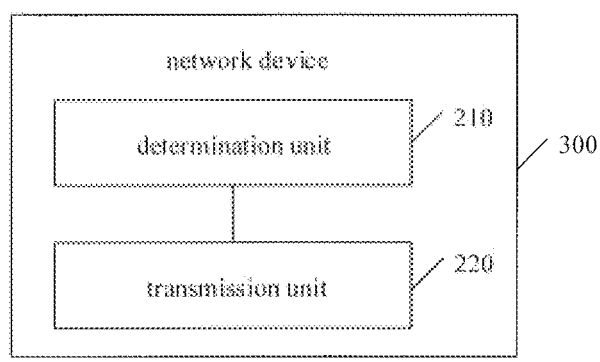
FIG. 7 illustrates a schematic block diagram of a network device for transmitting a signal provided by an embodiment of the disclosure.

FIG. 7 illustrates a schematic block diagram of a network device 300 for transmitting a signal provided by an embodiment of the disclosure. As shown in FIG. 7, the network device 300 includes a determination unit 310 and a transmission unit 320.

The determination unit 310 is configured to determine a basic transmission interval and at least one basic numerology.

The transmission unit 320 is configured to take the basic transmission interval as a time domain unit and employ parameters in the at least one basic numerology to perform transmission of data and/or a pilot signal with a second network device or a terminal device.

According to this embodiment of the disclosure, a novel network device for transmitting the signal is provided and can improve the flexibility of signal transmission.

Optionally, as an embodiment, the determination unit is specifically configured to determine the at least one basic numerology from multiple basic numerologies.

Optionally, as an embodiment, the transmission unit is specifically configured to determine the time length corresponding to transmission time unit in each basic numerology in the at least one basic numerology according to the at least one basic numerology; determine the number of transmission time units corresponding to the each basic numerology according to the basic transmission interval as well as the time length corresponding to the transmission time unit in the each basic numerology, the number of transmission time units being the number of transmission time units in the basic transmission interval; and respectively take the number of transmission time units corresponding to the each basic numerology as a time domain unit to perform the transmission of the data and/or the pilot signal with the second network device or the terminal device.

Optionally, as an embodiment, the determination unit is specifically configured to determine the basic transmission interval according to the stored preset information; or determine the basic transmission interval according to the received control signaling sent by the second network device or the terminal device, the control signaling being used for indicating the basic transmission interval.

Optionally, as an embodiment, the network device further includes a sending unit.

The sending unit is configured to send a control signaling to the second network device or the terminal device, so that the second network device or the terminal device determines the basic transmission interval according to the control signaling.

Optionally, as an embodiment, a time difference between a transmission time unit occupied by a scheduling signaling for scheduling the data and/or the pilot signal and a transmission time unit occupied by the data and/or the pilot signal sent or received by the first device is a positive integer multiple of the basic transmission interval.

Optionally, as an embodiment, a time difference between a transmission time unit occupied by the data sent by the network device and a transmission time unit occupied by corresponding ACK/NACK feedback information received by the network device is a positive integer multiple of the basic transmission interval, or a time difference between a transmission time unit occupied by the data received by the network device and a transmission time unit occupied by the corresponding ACK/NACK feedback information sent by the network device is a positive integer multiple of the basic transmission interval.

Optionally, as an embodiment, the network device further includes a second sending unit or a first sending unit.

The second sending unit is configured to send the ACK/NACK feedback information, the ACK/NACK feedback information being ACK/NACK feedback information corresponding to all data transmission blocks received by the device in a single basic transmission interval.

The first sending unit is configured to receive the ACK/NACK feedback information, the ACK/NACK feedback information being ACK/NACK feedback information corresponding to all data transmission blocks sent by the device in the single basic transmission interval.

Optionally, as an embodiment, the network device further includes a second receiving unit.

The second receiving unit is configured to receive a scheduling signaling sent by the second terminal device or the terminal device, the scheduling signaling being used for scheduling data transmission blocks in the single basic transmission interval.

Optionally, as an embodiment, the network device further includes a third sending unit.

The third sending unit is configured to send the scheduling signaling to the network device or the second terminal device, the scheduling signaling being used for scheduling the data transmission blocks in the single basic transmission interval.

It should be understood that, the network device 300 according to the embodiments of the disclosure may correspond to an execution main body of the method 100 for transmitting the signal in the embodiments of the disclosure. Furthermore, the above and other operations and/or functions of each module in the network device 300 are intended to implement a corresponding process of each method in FIG. 2, FIG. 3, FIG. 4 and FIG. 5 and will not be repeated for the conciseness.

It is to be noted that, when the apparatus provided by the above embodiments implements its functions, the division of each functional unit is only for example. During an actual application, the functions may be distributed to different functional units as required to be completed, that is, an internal structure of the device is divided into different functional units to complete all or parts of functions described above. In addition, the apparatus provided by the above embodiments and the method embodiments pertain to the same concept and the specific implementation process is referred to the method embodiments and will not be repeated here.

Figure 8:
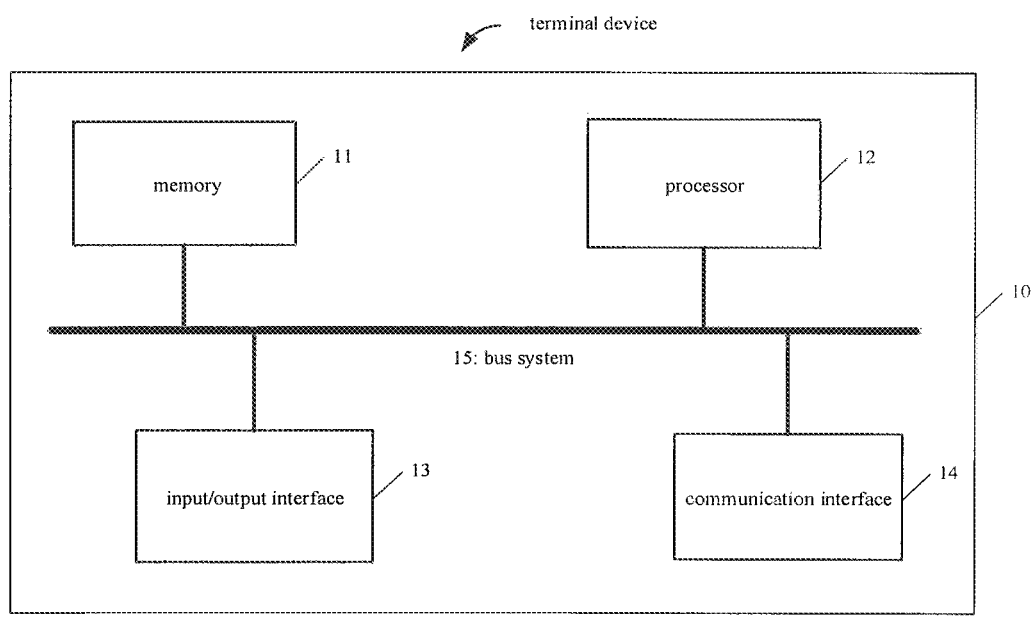
FIG. 8 illustrates another schematic block diagram of a terminal device for transmitting a signal provided by an embodiment of the disclosure.

FIG. 8 illustrates a schematic block diagram of a terminal device 10 according to an embodiment of the disclosure. The terminal device 10 shown in FIG. 8 includes: a memory 11, a processor 12, an input/output interface 13, a communication interface 14 and a bus system 15. Herein, the memory 11, the processor 12, the input/output interface 13 and the communication interface 14 are connected via the bus system 15; the memory 11 is configured to store an instruction; the processor 12 is configured to execute the instruction stored by the memory 11 so as to control the input/output interface 13 to receive input data and information, output data such as an operation result and control the communication interface 14 to send a signal.

The processor 12 is configured to determine a basic transmission interval and at least one basic numerology, and take the basic transmission interval as a time domain unit and employ parameters in the at least one basic numerology to perform transmission of data and/or a pilot signal with a network device or a second terminal device.

It should be understood that, in this embodiment of the disclosure, the processor 12 may be a Central Processing Unit (CPU), a microprocessor, an Application Specific Integrated Circuit (ASIC), or one or more integrated circuits, and is configured to execute a related procedure to implement the technical solutions provided by this embodiment of the disclosure.

It should be further understood that, the communication interface 14 employs, for example but is not limited to, a transmitter-receiver set such as a transmitter-receiver to implement the communication between the access network entity 10 and other devices or communication networks.

The memory 11 may include a Read-Only Memory (ROM) and a Random-Access Memory (RAM) and provides instructions and data for the processor 12. A part of the processor 12 may further include a nonvolatile random access memory. For example, the processor 12 may further store information on a type of a storage device.

Beside data bus, the bus system 15 may further include a power bus, a control bus and a state signal bus, etc. For clarity of description, various buses in the figure all are marked as the bus system 15.

In an implementation process, the steps in the foregoing methods may be completed using an integrated logic circuit of hardware in the processor 12 or an instruction in a form of software. The method for transmitting the signal disclosed in combination with the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 11. The processor 12 reads information from the memory 11 and completes the steps of the foregoing methods in combination with the hardware. To avoid repetition, details are not described herein again.

Optionally, as an embodiment, the processor 12 is specifically configured to: determine the at least one basic numerology from multiple basic numerologies.

Optionally, as an embodiment, the processor 12 is specifically configured to: determine the time length corresponding to transmission time unit in each basic numerology in the at least one basic numerology according to the at least one basic numerology; determine the number of transmission time units corresponding to the each basic numerology according to the basic transmission interval as well as the time length corresponding to the transmission time unit in the each basic numerology, the number of transmission time units being the number of transmission time units in the basic transmission interval; and respectively take the number of transmission time units corresponding to the each basic numerology as a time domain unit to perform the transmission of the data and/or the pilot signal with the network device or the second terminal device.

Optionally, as an embodiment, the processor 12 is specifically configured to: determine the basic transmission interval according to the stored preset information; or determine the basic transmission interval according to the received control signaling sent by the network device, the control signaling being used for indicating the basic transmission interval.

Optionally, as an embodiment, the processor 12 is specifically configured to: send a control signaling to the network device or the second terminal device, so that the network device or the second terminal device determines the basic transmission interval according to the control signaling.

Optionally, as an embodiment, the processor 12 is specifically configured to: receive a scheduling signaling sent by the network device or the second terminal device, the scheduling signaling being used for scheduling data transmission blocks in the single basic transmission interval.

Optionally, as an embodiment, the processor 12 is specifically configured to: send the scheduling signaling to the network device or the second terminal device, the scheduling signaling being used for scheduling the data transmission blocks in the single basic transmission interval.

Figure 9:
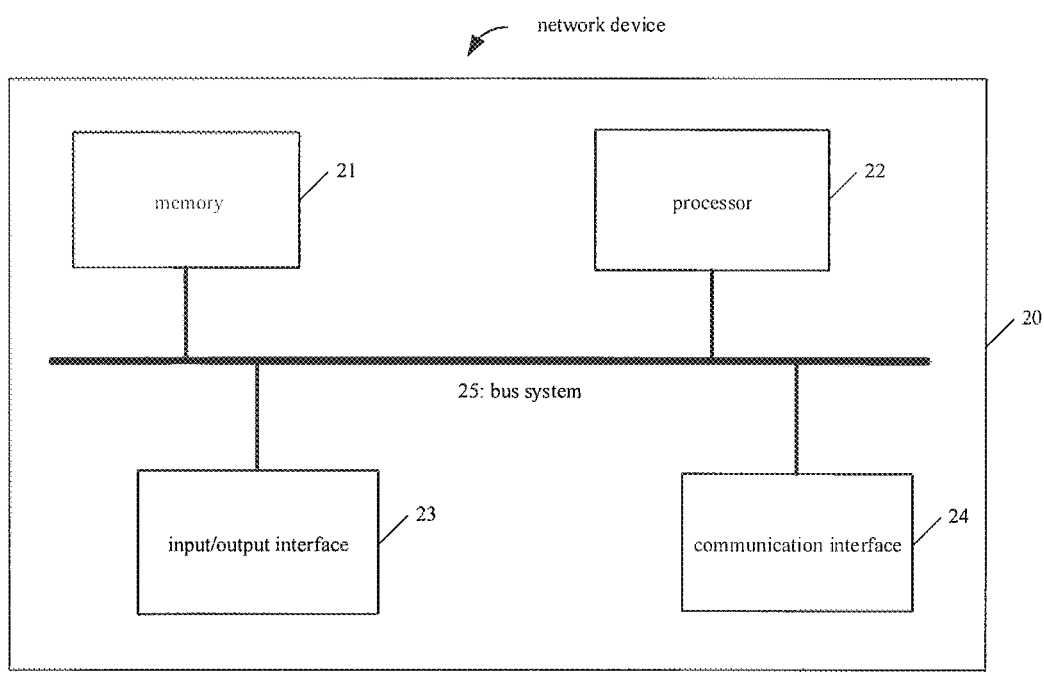
FIG. 9 illustrates another schematic block diagram of a network device for transmitting a signal provided by an embodiment of the disclosure.

FIG. 9 illustrates a schematic block diagram of a network device 20 according to an embodiment of the disclosure. The network device 20 shown in FIG. 9 includes: a memory 21, a processor 22, an input/output interface 23, a communication interface 24 and a bus system 25. Herein, the memory 21, the processor 22, the input/output interface 23 and the communication interface 24 are connected via the bus system 25; the memory 21 is configured to store an instruction; the processor 22 is configured to execute the instruction stored by the memory 21 so as to control the input/output interface 23 to receive input data and information, output data such as an operation result and control the communication interface 24 to send a signal.

The processor 22 is configured to determine a basic transmission interval and at least one basic numerology, and take the basic transmission interval as a time domain unit and employ parameters in the at least one basic numerology to perform transmission of data and/or a pilot signal with a second network device or a terminal device.

Optionally, as an embodiment, the processor 22 is specifically configured to: determine at least one basic numerology from multiple basic numerologies.

Optionally, as an embodiment, the processor 12 is specifically configured to: determine the time length corresponding to transmission time unit in each basic numerology in the at least one basic numerology according to the at least one basic numerology; determine the number of transmission time units corresponding to the each basic numerology according to the basic transmission interval as well as the time length corresponding to the transmission time unit in the each basic numerology, the number of transmission time units being the number of transmission time units in the basic transmission interval; and respectively take the number of transmission time units corresponding to the each basic numerology as a time domain unit to perform the transmission of the data and/or the pilot signal with the second network device or the terminal device.

Optionally, as an embodiment, the processor 12 is specifically configured to: determine the basic transmission interval according to the stored preset information; or determine the basic transmission interval according to the received control signaling sent by the second network device or the terminal device, the control signaling being used for indicating the basic transmission interval.

Optionally, as an embodiment, the processor 12 is further configured to: send the control signaling to the second network device or the terminal device, so that the network device determines the basic transmission interval according to the control signaling.

Optionally, as an embodiment, the processor 12 is further configured to: receive a scheduling signaling sent by the second network device or the terminal device, the scheduling signaling being used for scheduling data transmission blocks in the single basic transmission interval.

Optionally, as an embodiment, the processor 12 is further configured to: send the scheduling signaling to the second network device or the terminal device, the scheduling signaling being used for scheduling the data transmission blocks in the single basic transmission interval.

It should be understood that, in this embodiment of the disclosure, the processor 22 may be a Central Processing Unit (CPU), a microprocessor, an Application Specific Integrated Circuit (ASIC), or one or more integrated circuits, and is configured to execute a related procedure to implement the technical solutions provided by this embodiment of the disclosure.

It should further be understood that, the communication interface 24 employs, for example but is not limited to, a transmitter-receiver set such as a transmitter-receiver to implement the communication between the access network entity 20 and other devices or communication networks.

The memory 21 may include a Read-Only Memory (ROM) and a Random-Access Memory (RAM) and provides instructions and data for the processor 22. A part of the processor 22 may further include a nonvolatile random access memory. For example, the processor 22 may further store information on a type of a storage device.

Beside data bus, the bus system 25 may further include a power bus, a control bus and a state signal bus, etc. For clarity of description, various buses in the figure all are marked as the bus system 25.

In an implementation process, the steps in the foregoing methods may be completed using an integrated logic circuit of hardware in the processor 22 or an instruction in a form of software. The method for transmitting the signal disclosed in combination with the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 21. The processor 22 reads information from the memory 21 and completes the steps of the foregoing methods in combination with the hardware. To avoid repetition, details are not described herein again.

It should be understood that, in this embodiment of the disclosure, "B corresponding to A" represents that the B is associated with the A and the B may be determined according to the A. However, it should be further understood that the B is determined according to the A, which does not mean the B is determined only according to the A and the B may further be determined according to the A and/or other information.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for transmitting a signal, comprising:
   determining, by a first device, a basic transmission interval and one sub-carrier spacing, wherein the sub-carrier spacing is determined by the first device according to own working frequency point or selected by the first device from multiple sub-carrier spacing configured in the first device;
   determining, by the first device, according to the sub-carrier spacing, a time length corresponding to a transmission time unit in the subcarrier spacing;
   calculating, by the first device, according to the basic transmission interval and the time length corresponding to the transmission time unit in the sub-carrier spacing, a number of transmission time units corresponding to the sub-carrier spacing, the number of transmission time units being the number of transmission time units in the basic transmission interval, wherein in a case that the determined basic transmission interval is T and the time length of one transmission time unit is t, the number of transmission time units in the basic transmission interval is N=T/t by rounding, and the transmission time unit is an Orthogonal Frequency Division Multiplexing (OFDM) symbol;
   receiving, by the first device, an indication of a magnitude of a time window for Hybrid Automatic Repeat request (HARQ) timing sent by a second device, wherein the magnitude of the time window for HARQ timing is a time delayed by Acknowledgement (ACK)/Negative Acknowledgement (NACK) feedback compared with data transmission and the time window for HARQ timing takes the basic transmission interval as a unit;
   performing, by the first device, reception of downlink data by taking one basic transmission interval as a time domain unit;
   detecting, by the first device, a transmission block sent by the second device in the basic transmission interval; and
   upon the detection of the downlink data, performing, by the first device, ACK/NACK feedback corresponding to the transmission block with a delay of which a magnitude equals to the magnitude of the time window for HARQ timing,
   wherein determining, by the first device, the basic transmission interval comprises:
   in response to the data needing to be transmitted between the first device and the second device, receiving, by the first device, a 2-bit control signaling from the second device; and
   determining, by the first device, the basic transmission interval according to the received 2-bit control signaling, wherein the 2-bit control signaling indicates four basic transmission intervals including 1 ms, 2 ms, 4 ms and 8 ms and the four basic transmission intervals are appointed by the first device and the second device in advance and are configured in the first device or the second device, and the basic transmission interval is selected from the four basic transmission intervals.

2. The method of claim 1, wherein a time difference between a transmission time unit occupied by a scheduling signaling for scheduling the data and a transmission time unit that the first device receives the data is a positive integer multiple of the basic transmission interval.

3. The method of claim 1, wherein a time difference between a transmission time unit occupied by data sent by the first device and a transmission time unit occupied by corresponding ACK/NACK feedback information received by the first device is a positive integer multiple of the basic transmission interval, or a time difference between a transmission time unit occupied by data received by the first device and a transmission time unit occupied by the corresponding ACK/NACK feedback information sent by the first device is a positive integer multiple of the basic transmission interval.

4. A device for transmitting a signal, the device being a first device, and the device comprising a memory, a processor and a computer program stored on the memory and capable of running on the processor, the processor executing the computer program to execute operations comprising:
   determining a basic transmission interval and one sub-carrier spacing, wherein the sub-carrier spacing is determined by the first device according to own working frequency point or selected by the first device from multiple sub-carrier spacing configured in the first device; and
   determining, according to the sub-carrier spacing, a time length corresponding to a transmission time unit in the sub-carrier spacing;
   calculating, according to the basic transmission interval and the time length corresponding to the transmission time unit in the sub-carrier spacing, a number of transmission time units corresponding to the sub-carrier spacing, the number of transmission time units being the number of transmission time units in the basic transmission interval, wherein in a case that the determined basic transmission interval is T and the time length of one transmission time unit is t, the number of transmission time units in the basic transmission interval is N=T/t by rounding, wherein the transmission time unit is an Orthogonal Frequency Division Multiplexing (OFDM) symbol; and
   receiving, by the first device, an indication of a magnitude of a time window for Hybrid Automatic Repeat request (HARQ) timing sent by a second device, wherein the magnitude of the time window for HARQ timing is a time delayed by Acknowledgement (ACK)/Negative Acknowledgement (NACK) feedback compared with the data transmission and the time window for HARQ timing takes the basic transmission interval as a unit;

performing reception of downlink data by taking one basic transmission interval as a time domain unit;

detecting, by the first device, a transmission block sent by the second device in the basic transmission interval; and upon the detection of the downlink data, performing, by the first device, ACK/NACK feedback corresponding to the transmission block with a delay of which a magnitude equals to the magnitude of the time window for HARQ timing, wherein determining, by the first device, the basic transmission interval comprises:

when the data needs to be transmitted between the first device and the second device, receiving, by the first device, a 2-bit control signaling from the second device; and determining, by the first device, the basic transmission interval according to the received 2-bit control signaling, wherein 2-bit control signaling indicates four basic transmission intervals including 1 ms, 2 ms, 4 ms and 8 ms respectively and the four basic transmission intervals are appointed by the first device and the second device in advance and are configured in the first device or the second device, and the basic transmission interval is selected from the four basic transmission intervals.

5. The device of claim 4, wherein a time difference between a transmission time unit occupied by a scheduling signaling for scheduling the data and a transmission time unit that the first device receives the data is a positive integer multiple of the basic transmission interval; or wherein a time difference between a transmission time unit occupied by data sent by the first device and a transmission time unit occupied by corresponding ACK/NACK feedback information received by the first device is a positive integer multiple of the basic transmission interval, or a time difference between a transmission time unit occupied by data received by the first device and a transmission time unit occupied by the corresponding ACK/NACK feedback information sent by the first device is a positive integer multiple of the basic transmission interval.

6. The device of claim 4, wherein the first device is a terminal device and the second device is a network device.

7. A non-transitory computer-readable storage medium for storing a computer program, wherein the computer program causes a computer to execute operations comprising:

determining a basic transmission interval and one sub-carrier spacing, wherein the sub-carrier spacing is determined by a first device according to own working frequency point or selected by the first device from multiple sub-carrier spacing configured in the first device; and determining, according to the sub-carrier spacing, a time length corresponding to a transmission time unit in the sub-carrier spacing;

calculating, according to the basic transmission interval and the time length corresponding to the transmission time unit in the sub-carrier spacing, a number of transmission time units corresponding to the sub-carrier spacing, the number of transmission time units being the number of transmission time units in the basic transmission interval, wherein in a case that the determined basic transmission interval is T and the time length of one transmission time unit is t, the number of transmission time units in the basic transmission interval is $N=T/t$ by rounding, wherein the transmission time unit is an Orthogonal Frequency Division Multiplexing (OFDM) symbol;

receiving, by the first device, an indication of the magnitude of a time window for Hybrid Automatic Repeat request (HARQ) timing sent by a second device, wherein the magnitude of the time window for HARQ timing is a time delayed by Acknowledgement (ACK)/Negative Acknowledgement (NACK) feedback compared with the data transmission and the time window for HARQ timing takes the basic transmission interval as a unit;

performing, by the first device, reception of downlink data by taking one basic transmission interval as a time domain unit;

detecting, by the first device, a transmission block sent by the second device in the basic transmission interval; and upon the detection of the downlink data, performing, by the first device, ACK/NACK feedback corresponding to the transmission block with a delay of which a magnitude equals to the magnitude of the time window for HARQ timing, wherein determining, by the first device, the basic transmission interval comprises:

when the data needs to be transmitted between the first device and the second device, receiving, by the first device, a 2-bit control signaling from the second device; and determining, by the first device, the basic transmission interval according to the received 2-bit control signaling, wherein the 2-bit control signaling indicates four basic transmission intervals including 1 ms, 2 ms, 4 ms and 8 ms and the four basic transmission intervals are appointed by the first device and the second device in advance and are configured in the first device or the second device, and the basic transmission interval is selected from the four basic transmission intervals.

* * * * *